INVENTOR.
JAY B. KING
BY Richard G. Stephens
ATTORNEY

INVENTOR.
JAY B. KING
BY Richard D. Stephens
ATTORNEY

INVENTOR.
JAY B KING
BY Richard D. Stephens
ATTORNEY

INVENTOR.
JAY B. KING
BY Richard G. Stephens
ATTORNEY

INVENTOR.
JAY B. KING
BY Richard D. Stephens
ATTORNEY

INVENTOR.
JAY B. KING
BY Richard D. Stephens
ATTORNEY

INVENTOR.
JAY B. KING
BY Richard L. Stephens
ATTORNEY

INVENTOR.
JAY B. KING
BY Richard Q. Stephens
ATTORNEY

INVENTOR.
JAY B. KING
BY Richard D. Stephens
ATTORNEY

United States Patent Office 3,443,161

Patented May 6, 1969

3,443,161

COMPUTER CIRCUITS

Jay B. King, Ann Arbor, Mich., assignor to Applied Dynamics, Inc., Ann Arbor, Mich., a corporation of Michigan Filed Apr. 18, 1967, Ser. No. 631,665
Int. Cl. H02b 1/04, 9/00
U.S. Cl. 317—101 26 Claims

ABSTRACT OF THE DISCLOSURE

An electrical distribution system for connecting large numbers of conductors in a small space, such as at the back of a patchbay or switchboard in a manner to facilitate modular expansion wherein pluralities of etched circuit cards having their planes perpendicular to the patchbay or switchboard are sandwiched together to form pluggable assemblies, to allow conductors leading from the patchbay or switchboard front edges of the cards to be fanned out to other edges of the cards and distributed to adjacent cards of the same sandwich assembly.

The invention relates to electronic computer circuits, and more particularly, to an improved wiring arrangement which allows modular expansion of computer facilities in an economical manner.

In the analog and digital computer arts, and in various instrumentation applications, the needs of various users often vary extremely widely, in both the total number of computing elements required and the number of each type of computing element required, so that it is frequently necessary or desirable, usually for economic reasons, that a computer or like device be susceptible of modular construction in order to avoid wasted investment in unused equipment, and in order that a user's installation may be expanded or compacted or otherwise altered in nature as his needs increase or decrease. In furtherance of the above principles, it has been common for some time, in the general purpose analog computer art, for example, to provide computers containing "plug-in" operational amplifiers and various other "plug-in" devices, such as multipliers, function generators, and the like. The most popular prior art plug-in amplifiers have comprised printed-circuit boards carrying required transistors or tubes and other components, with an electrical connector mounted on one edge of the board to mate with another connector half permanently mounted within the computer cabinet. By making the amplifiers in "plug-in" (i.e. easily removable) types, it will be seen that computer manufacturers have been considerably aided in tailoring their computers to fit individual customer needs, by tailoring the number of plug-in amplifiers furnished with a computer. While the above-mentioned use of plug-in amplifiers and other plug-in circuits has shown great advantage and has achieved widespread usage, the provision of computers capable of substantial expansion still has been plagued by high cost due to the necessity of providing within the basic computer frame, all of the wiring to the many connectors which might have to be provided for future plug-in circuits. The installation of wiring between a computer patchbay and a plurality of connectors in which amplifiers may be plugged is obviously wasted if the amplifiers are never utilized, and it is usually very difficult and expensive to attempt to add additional cabling to a computer in the field. Recent requirements for increased computer bandwidth and computer accuracy have drastically increased the cost of much analog computer wiring. Very many computer circuits which were formerly unshielded now are required to be shielded, as by means of coaxial cable installations, adding greatly to the cost of wiring of the basic frame of a general-purpose analog computer.

While the present invention is illustrated in connection with making connections to the patchbay of a large hybrid analog-digital computer, it is important to note that the invention is of more general utility, and readily applicable as well to many other applications where a large number of wires must be routed to and connected in a limited space, and particularly to those applications where some or all of the lines must be shielded, and/or those applications where a modular expansion capability is desirable or necessary. The invention will be useful, for example, in various telephone switchboard and digital computer installations.

The invention provides marked advantages over prior systems which rely principally on cables and wires for most electrical circuit distribution. Cables require relatively large amounts of space and they must be laced or otherwise bundled and mechanically tied at various points to the machine frame, they sometimes move or become loose when subjected to high acceleration forces or to vibration, and they frequently are difficult to service or adequately inspect unless completely torn out. Cabling with different lengths of cable to plural circuits often has resulted in undesirable performance of various of the circuits, the performances of which it has been desirable to match, unless uniform cable lengths have been selected, which frequently has resulted in wasted space. In the invention, the performance characteristics, including the capacitances to ground and capacitances between various conductors, can be predetermined and exactly controlled, so that the performance of circuits which are added later can be known beforehand and can be matched to those of initially-installed circuits.

A primary object of the present invention is to provide an improved computer arrangement in which the amount of cabling required is drastically reduced.

Another object of the invention is to provide a computer assembly of the type mentioned which may be expanded easily by adding modules of selected types, or which may be changed radically in character easily and economically merely by substituting modules of different types.

An additional object of the invention is to provide an improved computer arrangement in which the connections between a distribution center such as a patchbay and various computing circuits may be installed and removed quickly and easily, and in which the electrical characteristics of such connections can be known and predetermined, so that the performance of pairs or groups of computing elements may be matched to each other.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

Figure 4:
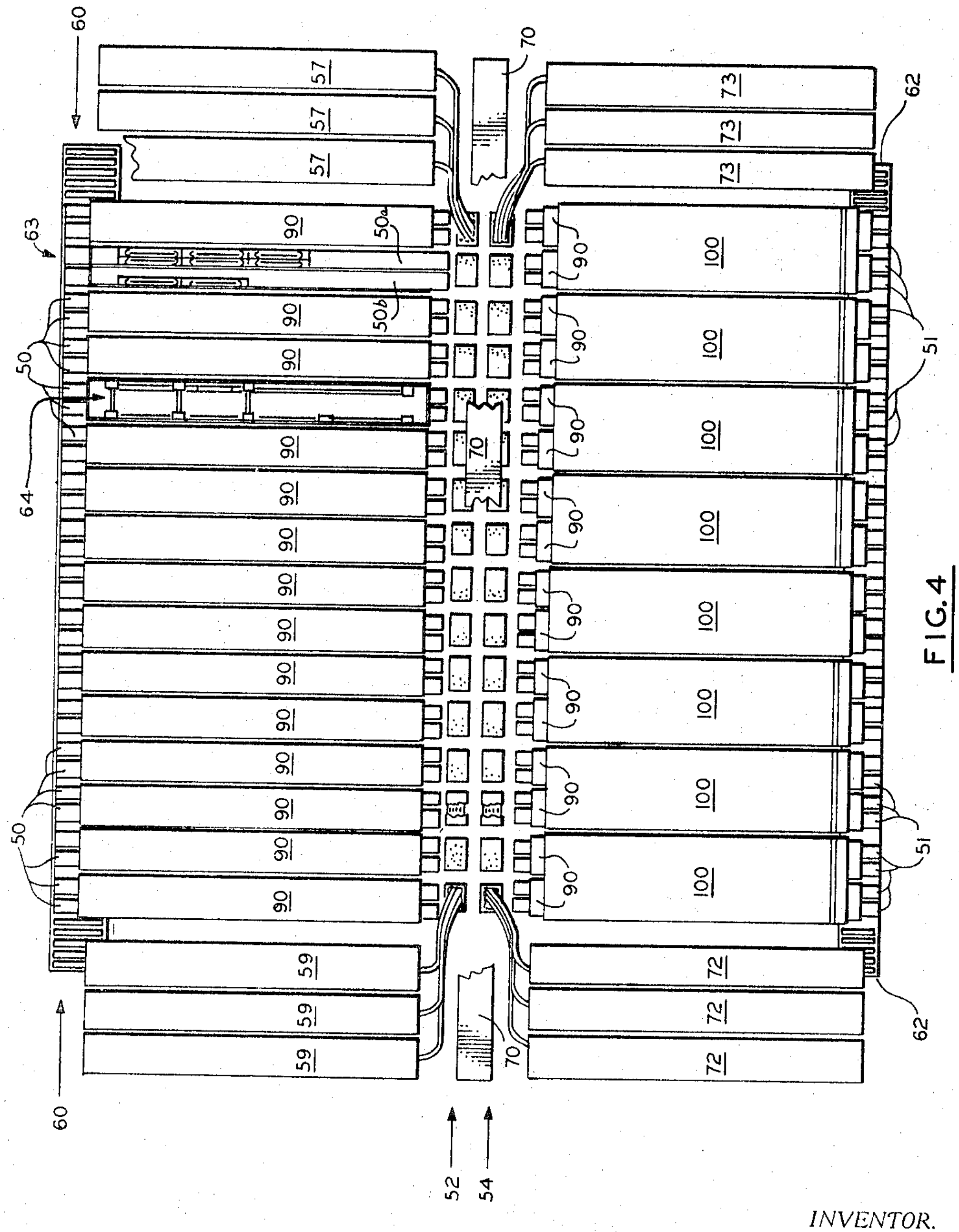
FIG. 4 is an elevation view at 4—4 in FIG. 2, looking toward the rear of the patchbay with most of the circuits of the computer connected and in place.
Figure 4A:
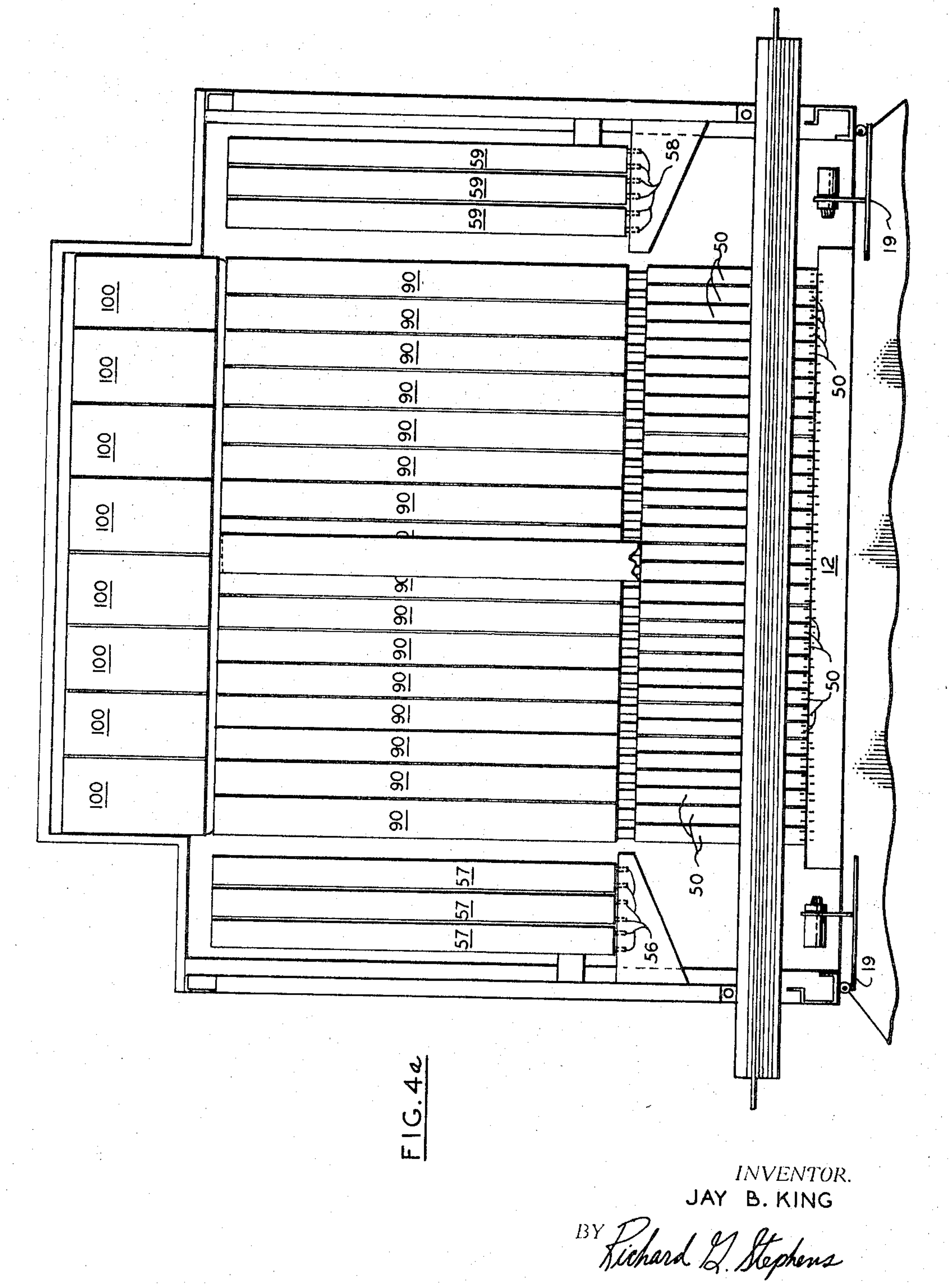

FIG. 4*a* is a plan view of the apparatus of FIG. 4.

Figure 5:
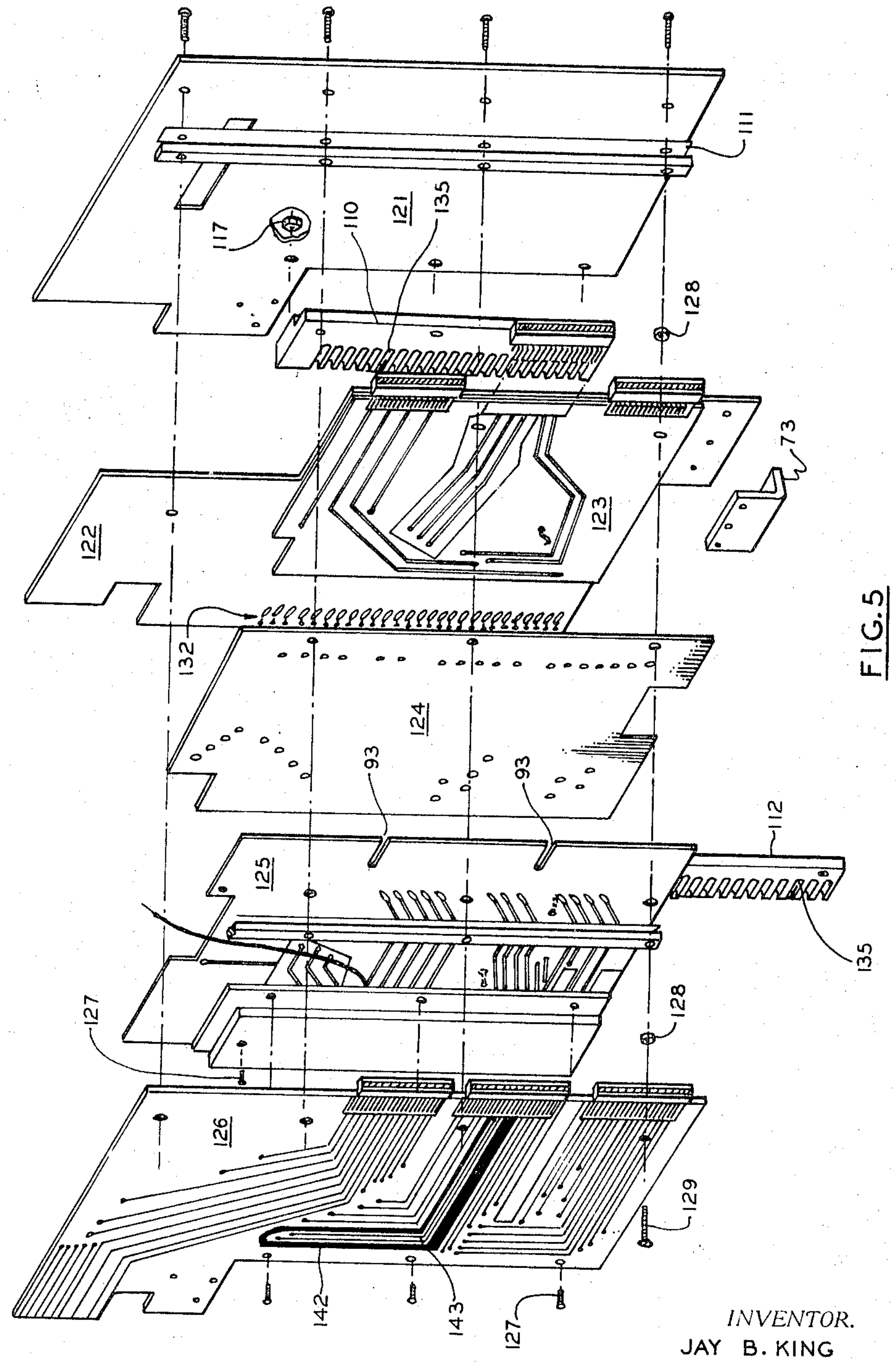
Figure 6A:
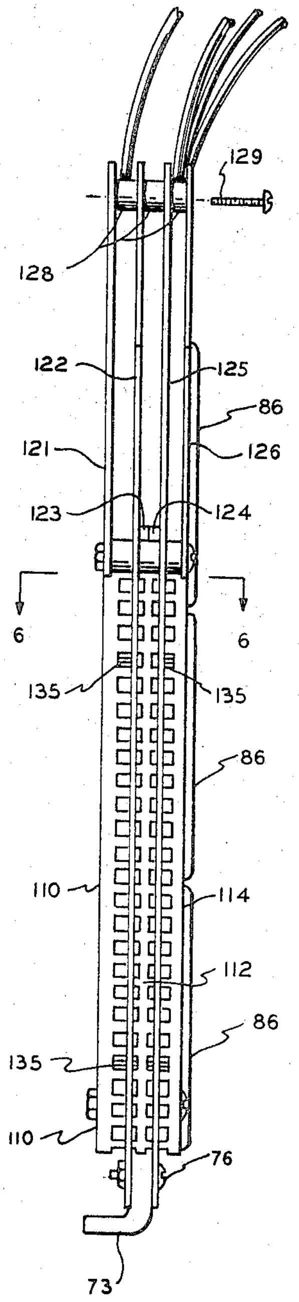
Figure 6C:
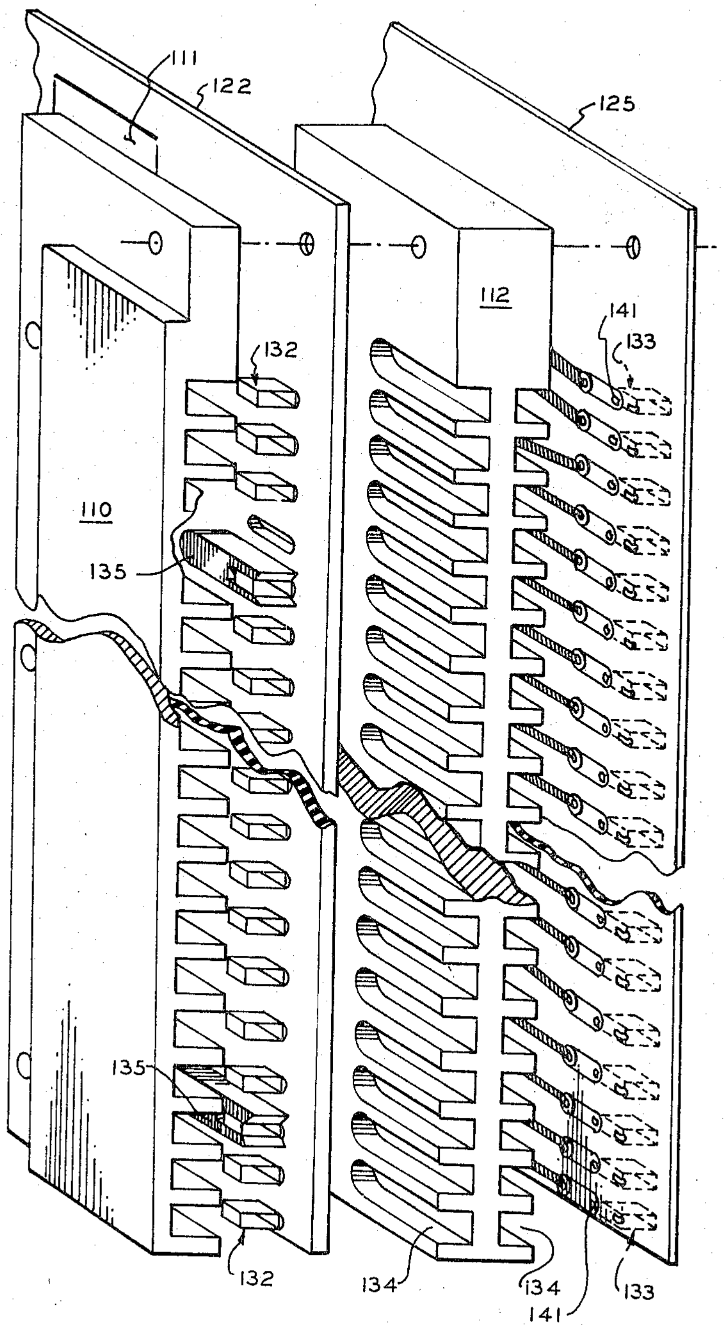
Figure 6B:
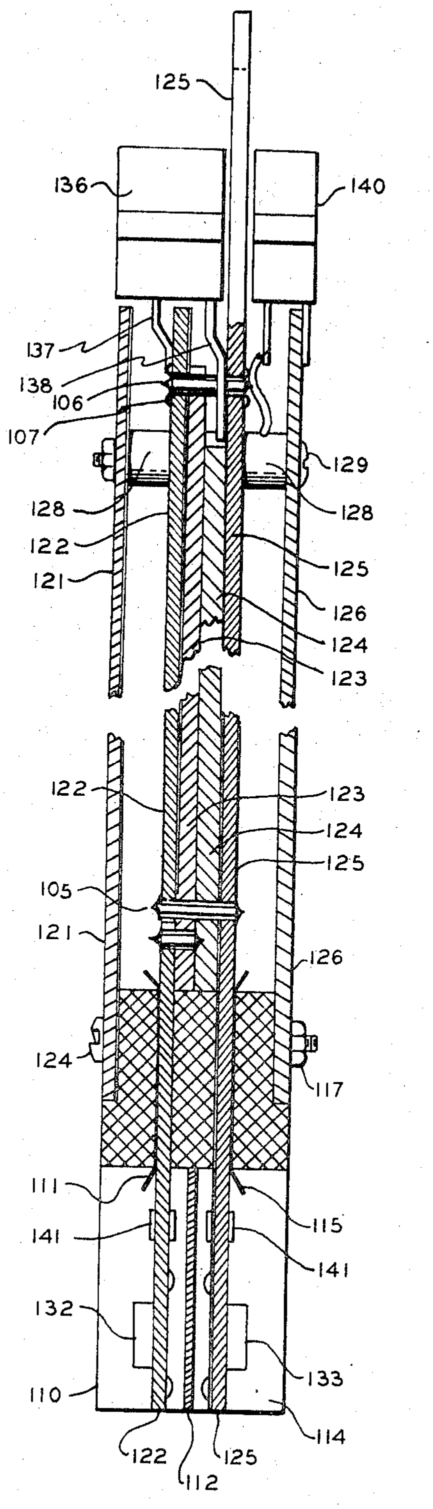

FIG. 5 is an exploded view of an exemplary circuit connection assembly, or header, constructed in accordance with the invention. FIG. 6*a* is a front view of the header of FIG. 5, FIG. 6*b* is a section view taken at lines 6—6 in FIG. 6*a*, and FIG. 6*c* is an exploded and enlarged view of a portion of the header of FIG. 5.

Figure 7:
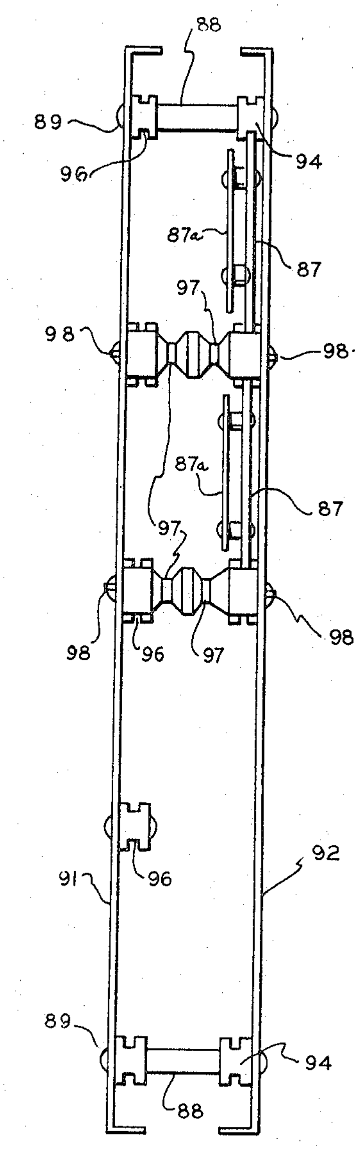
Figure 7A:
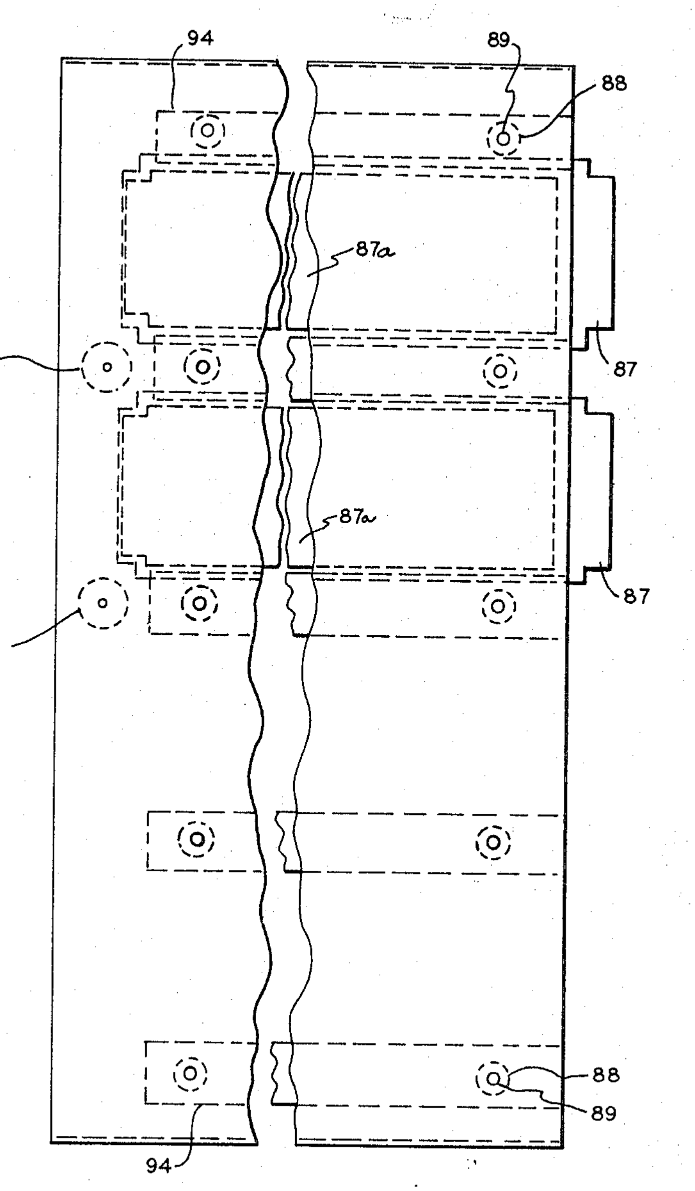

FIGS. 7 and 7*a* are front and side views, respectively, illustrating an exemplary component module rack or "can" used with the invention.

Figures 8, 8A:
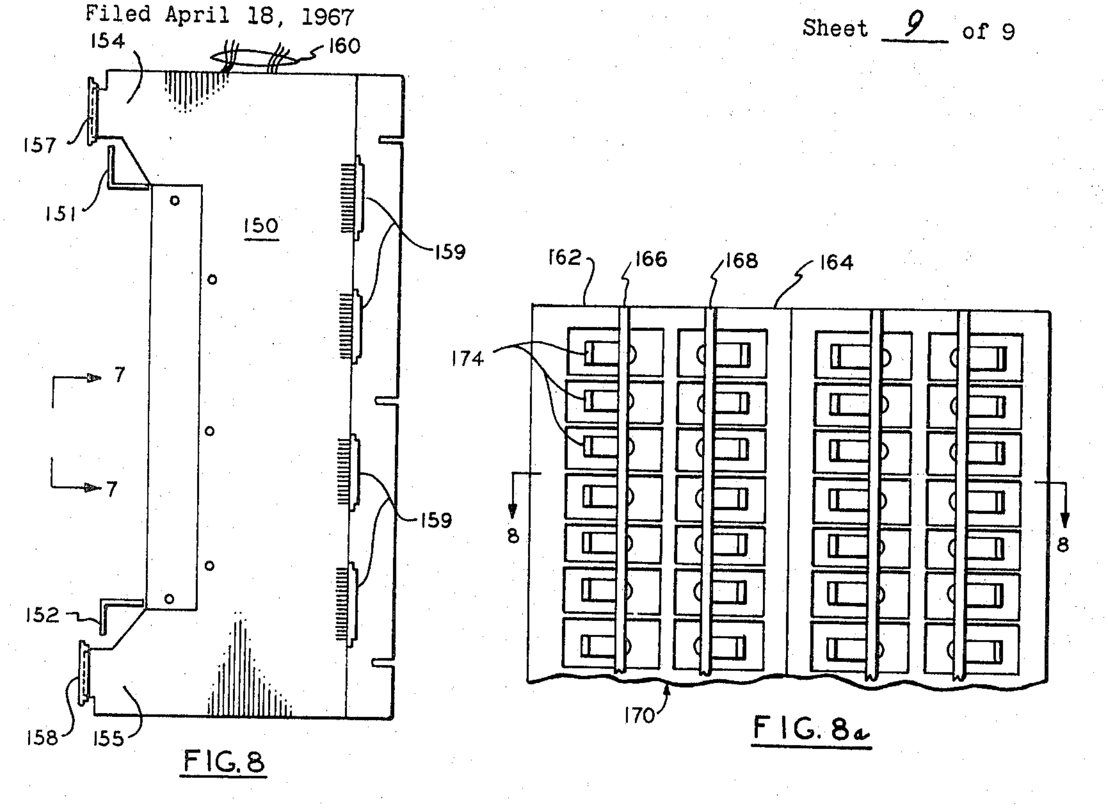
Figure 8B:
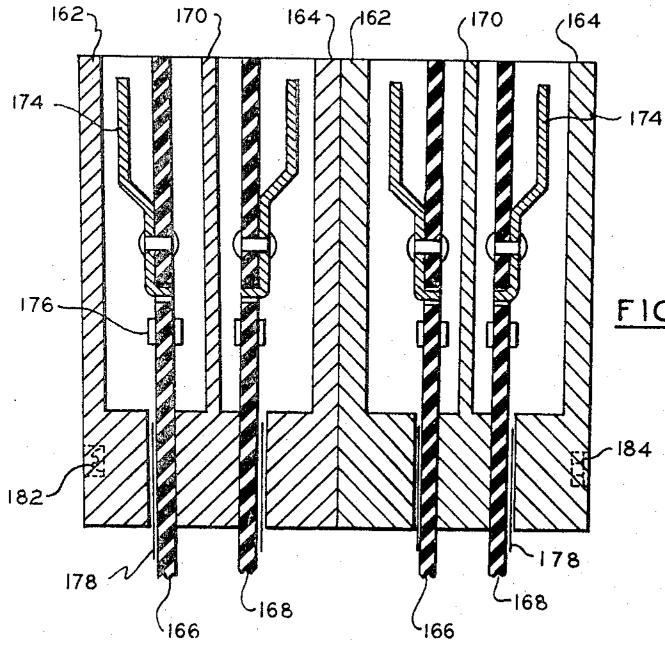

FIGS. 8, 8*a* and 8*b* illustrate an alternative embodiment of circuit connection card which functions also as a patchbay. FIG. 8*a* is a sectional elevation view taken at lines 7—7 in FIG. 8, and FIG. 8*b* is a downward section view taken at lines 8—8 in FIG. 8*a*.

Figures 1, 2:
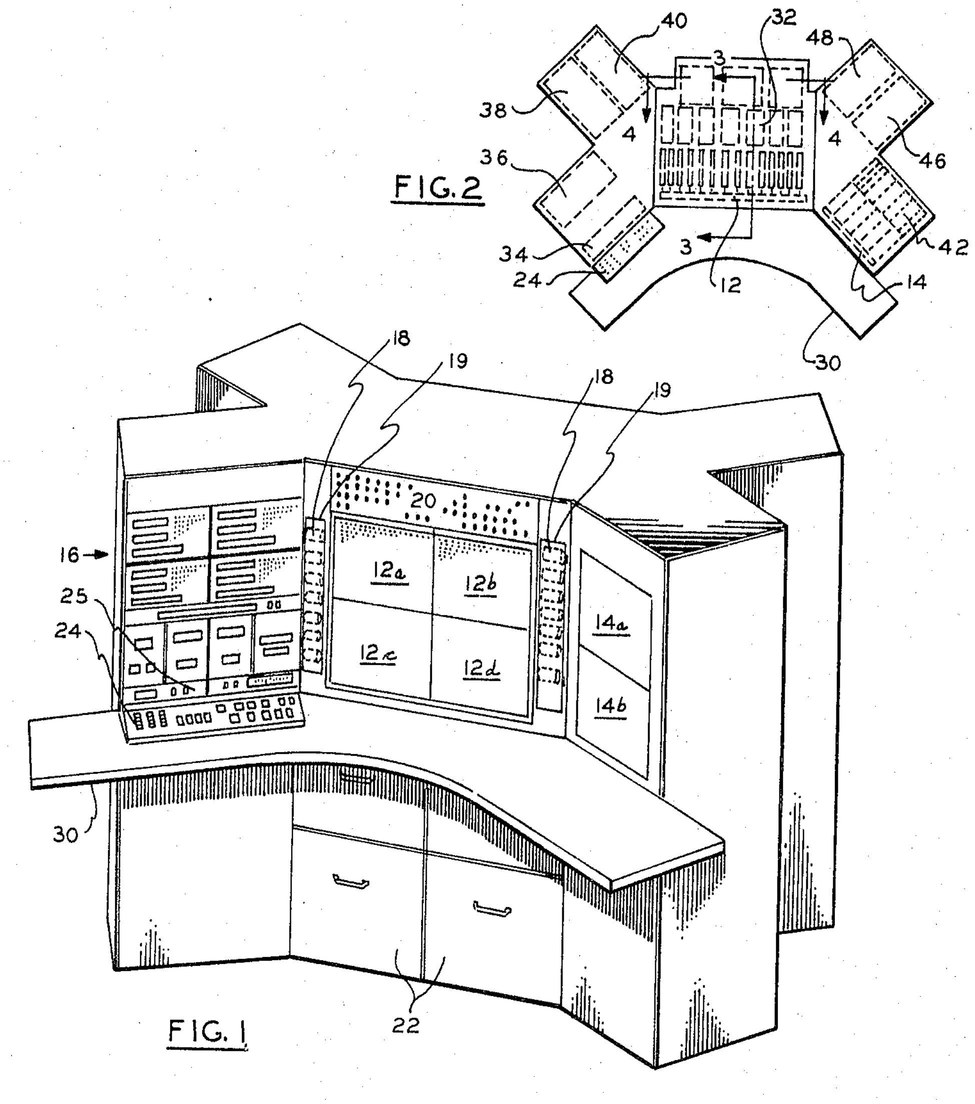
FIG. 1 is a perspective view of an exemplary computer cabinet assembly designed to incorporate the invention.
FIG. 2 is a plan view of the computer of FIG. 1.

The computer is shown in FIG. 1 as comprising a plurality of interconnected cabinets grouped around and facing toward the front of the computer, which includes a shielded main patchbay 12 (shown divided into four separate fields 12*a*, 12*b*, 12*c*, and 12*d*) hereinafter termed the analog patchbay, a second unshielded patchbay 14, hereinafter termed the logic patchbay, which is divided into two separate fields 14*a* and 14*b*, and a control center 16 where there are mounted various controls and indicators. A plurality of hand-set coefficient potentiometers are arranged in vertical rows at 18, 18 on each side of the analog patchbay 12, on the insides of hinged panels on doors 19, 19, to allow the potentiometers to be hidden inside the computer. A plurality of indicator lamps to indicate overload and overrange conditions are mounted on indicator panel 20. At the bottom of the center portion of the computer, several slide-out drawers 22, 22 contain programmable diode function generator circuits. Shelf 30 is provided for the convenience of the computer operators. A main keyboard 24 carried on shelf 30 includes a plurality of pushbuttons, and an indicator panel 25 displays various input data fed into the computer and output data calculated by the computer.

The general locations within the computer cabinets of many of the computer elements are shown in dashed lines in FIG. 2. Directly behind the patchboard within an area shown at 32 are mounted, within a number of removable module racks or "cans," a large number of amplifier scaling resistor networks, electronic multipliers, fixed-function diode function generators such as sine, cosine and log function generators, comparator circuits, electronic switches and relays. The equipment mounted at area 32 in general involves those sensitive circuits from which it is particularly desirable to keep patchcord leads short. Mounted at 34 are various control display modules. The area shown at 36 includes a variety of control components and interface equipment which may be used to interconnect the apparatus with a general purpose digital computer. The areas 38 and 40 at the left rear of the computer contain racks carrying operational amplifiers, digital-to-analog converter networks and servo-set potentiometers and their associated equipment. Area 42 at the right front of the computer houses a number of logic components, most of which must connect to logic patchboard 14. Areas 46 and 48 at the right rear of the computer include further coefficient devices, further operational amplifiers, and various power supplies. It may be noted that left-side areas 38, 40 and right-side areas 46, 48 are symmetrically disposed about the center of patchbay 12, which advantageously allows the connections from the left side of patchbay 12 to a given amplifier in one of the left-side areas to have the same physical dimensions, and hence the same resistance and capacitance, as the corresponding connections from the right side of patchbay 12 to an amplifier in one of the right-side areas, and in fact allows the cables used to be identical. The arrangement also allows shorter length cables to connect the circuits in areas 38, 40, 46 and 48 to the patchbay.

The four sections of analog patchbay 12 each comprise a known form of patchbay preferably comprising a matrix (rows and columns) of individually shielded female plug receptacles adapted to receive the mating male plugs of a conventional removable patchboard (not shown) which may be fitted with cords and plugs in conventional fashion to interconnect various patchbay contacts in patterns dictated by the problems to be solved by the computer. In an exemplary embodiment of the invention the four fields of patchbay 12 includes 3,840 receptacles arranged in 60 rows and 64 columns. The rear of the patchbay presents a honeycomb structure of metal shielding with the individual contacts mounted on ⅜ inch centers and protruding rearwardly beyond the honeycomb shielding approximately ¾ inch. It will be recognized that most of the computer elements mentioned must be connected to one or both of the patchbays and/or to various of the other elements, so that many thousands of wire or other connections must be made within the computer. In the actual computer being described it was determined that each one of the 3,840 patchbay receptacles had to be connected, on an average basis, to about 6.6 other terminals, so that approximately 25,344 connections were needed to contacts of patchbay 12. It will be readily apparent that it would be extremely difficult, if not impossible, to make all such connections directly to the patchbay contacts, within the area of roughly one square yard at the rear of the patchbay, particularly when one considers both that most of such connections must be shielded and that a wide variety exists in the number of connections which various of the patchbay contacts require. Some patchbay contacts must lead to 30 or more terminals, while some other contacts need lead to only one or two terminals. And merely increasing the size of the patchbay is not a satisfactory solution, as it not only would be inconvenient to the operator, but would require the use of longer patchcords, which can seriously degrade computer bandwidth.

In the prior art it has been usual practice to provide a plurality of multiconductor cables to make electrical connections between the many patchbay connectors and the computer circuits mounted within the cabinets of the computer, frequently by means of wire-wrap connections made to connection posts extending rearwardly from the patchbay connectors. Because it would be extremely difficult and expensive to re-route existing cables and to add and connect additional cables in the field, it has been economically necessary in prior art computers to furnish complete cabling for all computer circuits which might possibly ever be incorporated in the computer, even though the computer is initially expected to be furnished with only a partial and limited complement of amplifiers, multipliers, function generators and similar devices. In the present invention, on the other hand, a major portion of the many necessary connections between the patchbay and the computing elements are made by means of rigid circuit connection cards carrying etched circuits, with connectors rigidly mounted on the front of such cards to connect to the connections of the patchbay, and with connection means provided at one or more of the other edges of the cards to connect to computing elements, and in some cases to cables. To further minimize the amount of cabling required, a large portion of the computing circuit cards are adapted to engage printed circuit connectors mounted on the rear of the mentioned etched circuit connection cards, so that the circuit connection cards directly electrically connect, without intervening wiring being necessary, from the patchbay to the computing circuit cards which they carry. In order to facilitate handling and prevent bending of the individual circuit connection cards, the cards are grouped into pluralities which are sandwiched together and rigidly interconnected to form stiff and strong mechanical assemblies, termed "headers," which themselves may be plugged and unplugged easily to and from rows of contacts on the rear of the patchbay, and to and from which assemblies of circuit network cards may be easily plugged and unplugged. As well as carrying rear-edge connectors to connect to the circuit network cards, the circuit connection card assemblies, or headers, also may carry connectors at their top and/or bottom edges, as may be required, to allow connections to be made through conventional cabling to various other devices within the computer.

Figure 3:
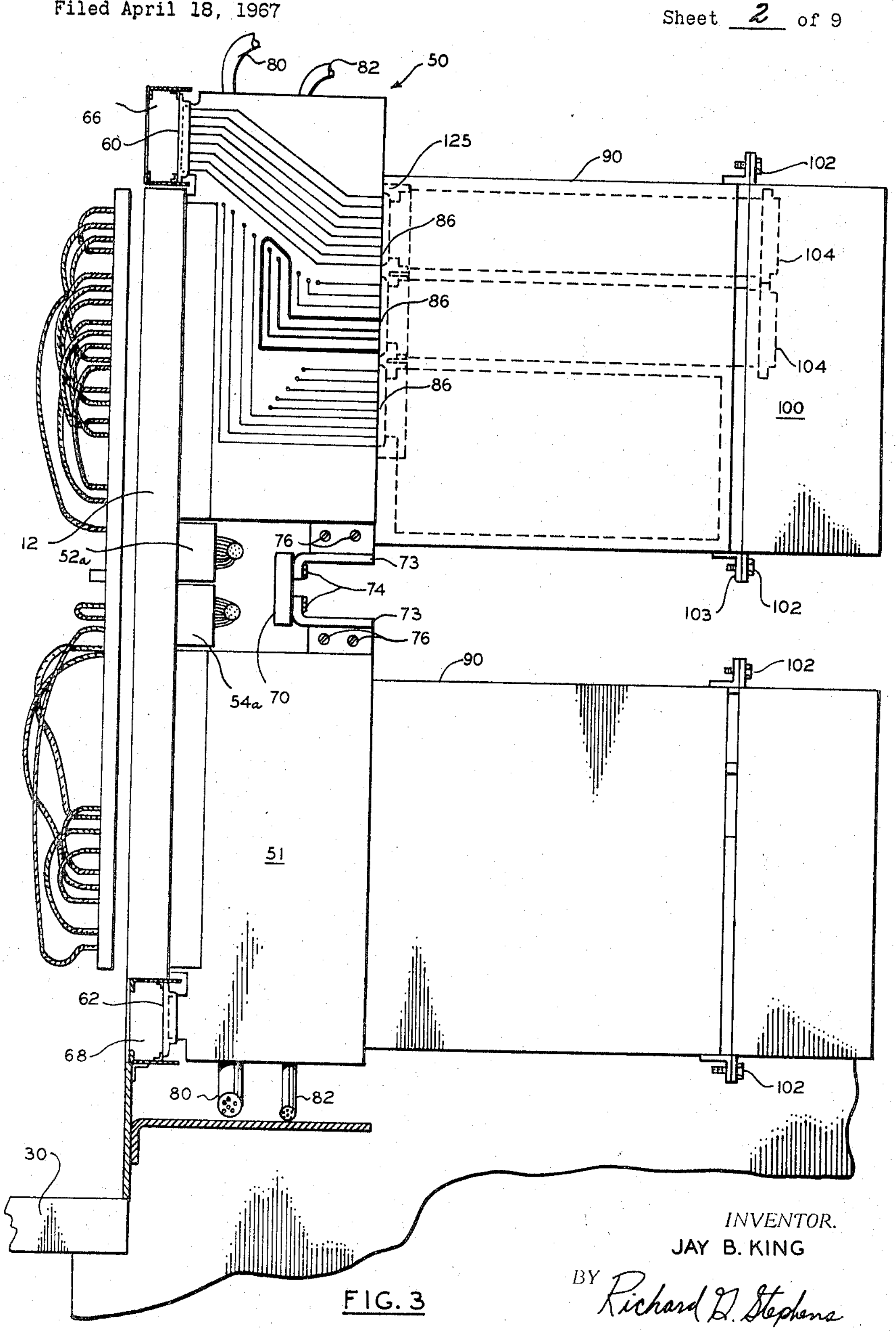
FIG. 3 is a sectional elevation view taken at lines 3—3 in FIG. 2.

As best seen in FIGS. 3, 4 and 4*a*, a total of 32 upper headers 50, 50 are shown plugged into the 64 columns of contacts extending from the rear of patchbay 12, and these upper headers each engage the uppermost 26 contacts of two adjacent columns of patchbay contacts. A similar group of 32 lower headers 51, 51 are spaced across the lower half of the patchbay, each to engage the lowermost 26 contacts of a pair of adjacent columns of patchbay contacts. As mentioned above, there are 60 contacts in each column. The middle eight rows of patchbay contacts are not shown as being engaged by any of the headers, but instead by an upper row 52 and a lower row 54 of shielded connector plugs, with 16 plugs in each row, with each plug carrying four contacts in four rows, and with conventional shielded cabling extending from each of the plugs. The cables from the 8 plugs on the left in upper row 52 extend to six columns of connectors 56, 56 (FIG. 4*a*) into which an upper left-side field distribution unit 57 is plugged, and the cables from the 8 plugs on the right in upper row 52 extend to six columns of connectors 58, 58 into which an upper right-side field distribution unit 59 is plugged. The connector plugs in lower row 54 similarly extend to right and left-side field distribution units, 72, 73. Much of the cabling from the connector plugs of rows 52, 54 has been omitted from FIG. 4 for sake of clarity. Each field distribution unit comprises three component module racks or "cans" carrying etched circuit cards, as will be explained below in greater detail. While the headers to be illustrated in detail are shown extending across only a portion of a pair of columns of patchbay contacts, it will be apparent that they may be made to extend across across entire columns of contacts without departing from the invention.

As well as plugging into 26 rows of a pair of columns of patchbay contacts, the front edge of each header plugs into a pair of adjacent printed circuit connectors (AMP., Inc. Type 582766–2), a row of 76 such connectors being mounted across the top of the patchbay at 60 and a row being mounted just below the bottom of the patchbay at 62, each on the rear side of a bussing raceway along which power busses, relay ground busses, reference voltage busses, overload busses and addressing control lines are routed, and by this means such buss and control circuitry is connected to the headers. The upper raceway is shown at 66 and the lower raceway at 68 in FIG. 3.

In order that all circuits leading from patchbay 12 be effectively shielded, each header includes various ground conductor areas plated on one or more sides of various of its etched cards, as will be described below in connection with FIG. 5, and in order that such ground conductor areas be effectively grounded through short low-resistance paths, a heavy (½" x 3") copper signal-ground buss 70 (FIG. 3) extends between the upper and lower rows of headers as shown, and a ground strap 73, 73 from each header is bolted to the signal-ground buss 70, as by bolts 74, 74. The header connections to ground buss 70 have been omitted from FIG. 4 for sake of clarity.

As shown in FIG. 3, a plurality of shielded cables 80 and a plurality of unshielded wires 82 which are permanently connected to various conductors on the upper headers extend from the upper edge of each upper header, and similar cables and wires extend from the lower edge of each lower header. These cables and wires are routed to equipment racks in areas 38, 40, 42, 46, and 48 (FIG. 2).

The rear edge of each header is shown as carrying one or two rows of female printed circuit connectors 86, 86 to which various of the plated conductors on the header cards are permanently soldered, and into which various circuit network cards are adapted to be plugged. The circuit network cards include, for example, the scaling resistors associated with summing amplifiers, quarter-square electronic multipliers, and sine-cosine and log function generators, each such circuit or several such circuits being carried on a separate etched circuit card. A plurality of such circuit cards are carried in each of a plurality of component racks or module "cans," 90, 90. While the backs and edges of each component module can are actually open, exposing the circuit cards in each such can, circuit cards are shown installed in only one module can, at 64 in FIG. 4, for ease of illustration. Each component module can fits onto the rear edge of an adjacent pair of headers, with the connectors on the rear edges of an adjacent pair of headers and one card of a header extending within a component module can, and with the front edge of each module can extending forwardly to the rear edges of other cards of the header which carry ground shielding, so that various conductors will be completely shielded all the way from the patchbay back to within the component module cans. Sixteen component module cans are shown mounted behind each of the two rows of headers. In addition, each field distribution unit, such as 57 and 59, comprises three component module cans which do not plug into headers, but instead plug into the connectors (56, 58 in FIG. 4, for example) to which the wires from the connecting plugs of plug rows 52 and 54 connect. In FIG. 4, one component module can has been removed, at 63, to expose two headers **50*a* and 50*b* into which it plugs. Six connectors are shown on the rear edge of header 50*a* and two connectors on the rear edge of header 50*b***.

A typical component module "can" or rack 90 is illustrated in FIGS. 7 and 7*a* as comprising a pair of spaced-apart metal sheets 91, 92 having a plurality of H-shape horizontally-extending guide bars 94, 94. Sheets 91, 92 are rigidly held together and spaced apart by hollow spacers 88, 88 and through rivets 89, 89. Slots 96, 96 in adjacent pairs of guide bars on each side of the cam receive and hold the edges of circuit network cards 87, 87 as the cards are slid into the component module cans. For ease of illustration only two network cards are shown in place in FIGS. 7 and 7*a*, and it will be apparent that further cards may be installed similarly. Additional circuit cards **87*a*, 87*a* are mounted to and spaced from cards 87, 87 by means of spacers, and the front ends of cards 87*a*, 87*a* engage connectors 86 on the rear of the same header as those engaged by the front ends of cards 87, 87. Each component module can include a pair of transverse shafts 98, 98 rotatably mounted in holes near the front edge of the can. Each shaft is provided with two pairs of tapers to two reduced-diameter portions 97, 97. The reduced diameter portions of the shafts register in slots 93, 93 (FIG. 5) provided at the rear edges of one of the cards of each of the headers, thereby serving to locate the headers, both vertically and horizontally as a given module can is plugged into the rear edge of an adjacent pair of headers, so that the plated conductors at the front edges of the circuit network cards 87, 87*a* carried in the component module can accurately engage the two rows of female connectors 86, 86 mounted at the rear edge of each header. The rear edge of each component module can rests on a cross-brace 103 (FIG. 3) which extends across the back of housing 32**.

The front and rear sides and the tops and bottoms of the component module cans are open, and the rear edges of one or more of the circuit network cards (notably the electronic integrator circuit cards) protrude beyond the rear edges of their respective cans, as best seen in FIG. 7*a*. A capacitor assembly can 100, 100 (FIGS. 3, 4 and 4*a*) comprising a closed environmentally-controlled housing carrying a plurality of computing capacitors (not shown) extends across the backs of a pair of adjacent component module cans and is bolted at 102 to the pair of module cans, and the conductors at the protruding rear edges of the integrator circuit cards engage ribbon connectors 104, 104 mounted on the front face of the capacitor housing which electrically connect the computing capacitors to the integrator circuit cards. In FIG. 4 capacitor assembly cans 100, 100 are shown mounted only on the lower row of component module cans, for ease of illustration, but such cans may be mounted as well, of course, across the backs of the upper row of component module cans.

The exemplary sandwiched circuit connection card assembly or header shown in FIGS. 5, 6*a*, 6*b* and 6*c* includes at its front edge, as best seen in FIG. 6*a*, an outer shield plate 110, an etched circuit card 122, center shield plate 112, an etched circuit card 125, and outer shield plate 114. The inner faces of outer shield plates 110 and 114 each are provided with 26 milled slots 130 as best seen in FIG. 6*c*, to provide openings into which 26 contacts of a respective row of patchbay contacts protrude. Shield plates 110, 112 and 114 may be made of metal, such as aluminum, or alternatively may be made of plastic and covered with an electrically conductive coating. The upper 26 rectangular bar patchbay contacts of one row of the patchbay engage 26 box contacts 132, 132 staked on card 122 near its front edge, and the contacts of the adjacent row similarly engage 26 contacts 133 aligned along the front edge of card 125. Box contacts 132 and 133 may comprise, for example, AMP. Cat. No. 85485–4 or an equivalent type. Center shield plate 112 is provided on each side with 26 clearance slots 134, 134 which align with the slots in plates 110 and 114, thereby providing each box contact with shielding on all sides except the front edge of the header. Four nylon guides 135, 135 located in four of slots 130 are provided with beveled lips as shown, which serve to center the header assembly in a vertical sense as it is pressed onto the row of patchbay contacts.

Outer shield plates 110 and 114 are each provided with upper and rear recessed shoulders, to which outer cards 121 and 126 are affixed, as by means of screws 129, 129, which preferably pass through the entire header assembly to engage nuts 117, 117. The shoulder recesses have the same depth as the thickness of cards 121 and 126, so that the outer faces of cards 121 and 126 are substantially flush with the outer faces of shields 110 and 114. Thin strips of .005 inch Fiberglas sheet insulation 111, 115 extend along the rear sides of outer shield plates 110 and 114 to insulate the rear edges of the shields from cards 122 and 125, to allow individual plated conductors on the outer sides of cards 122 and 125 to enter the cavities of shield plates 110 and 114 without being shorted by the closed rear edges of the shield plates. Extending rearwardly from center shield 112, and sandwiched between cards 122 and 125, are a further pair of etched circuit cards 123 and 124. A plurality of washers 128, 128 situated between cards 121 and 122 and between cards 125 and 126 on through bolts or screws 129, 129, serve to properly space the rear portions of these cards, both to insulate portions of the cards from each other and to provide a rigid assembly of substantially uniform width. Card 125 extends rearwardly past the other cards of the assembly and is provided with slots 93, 93, which engage the reduced-diameter portions of the shafts 98, 98, of a component module can when such a can is plugged into the rear of the header, as mentioned above.

Mounted along the rear edges of each of cards 122 and 123 are three 44-contact dual ribbon connectors 136, 136 (AMP., Inc. Type 582766–2) having two rows of 22 contacts each and a terminal bar 137, 138 extending from each connector contact. Various of the terminal bars are soldered to conductors on card 122 and various soldered to conductors on card 125, with slight offsets being provided as required, as best shown in FIG. 6*b*, to allow a given terminal bar to be soldered to a desired side of a desired board. Similarly, three ribbon connectors 140, 140 are mounted along the rear edge of card 126, with various terminal bars soldered to conductors on the outside of card 126. One row of connector bars is shown not connected in FIG. 6*b*. These terminal bars actually may be offset and soldered to a desired one of the circuit boards, or wires which extend out the top or bottom of the header, such as some of those shown at 80 in FIG. 3, may be connected to various of these terminal bars. Various different types of headers for different computer circuits may carry less than six rear-edge connectors, and it is within the scope of the invention to use more connectors, of course, where required on headers carrying more circuits.

The circuit from each patchbay-engaging box contact mounted on the outer sides of cards 122 and 125 near their front edges extends, as best seen in FIG. 6*c*, from its respective bent-over prongs on the inner side of card 122 or 125 to an adjacent eyelet 141 to which the box contact prongs are soldered. The eyelet extends between the respective cavity in center shield plate 112 and the mating cavity in outer shield 110 or 114, and then plated conductors extend toward the rear of the assembly from the respective eyelets on the outer sides of cards 122 and 125, the plated conductors being insulated from the closed rear edges of shield plates 110 and 114 by insulation strips 111 and 115 (FIGS. 5, 6*b* and 6*c*).

The conductors on the outer side of card 122 may extend to and be soldered to various of the terminal bars of the ribbon connectors mounted at the rear edge of card 122, and/or may extend to the upper forward edge of card 126 to engage a ribbon connector mounted above patchbay 12 as shown in FIG. 3, and/or may extend to eyelets through which wires are soldered to connect to eyelets and conductors on other cards of the assembly, or may extend to eyelets from which wires extend, and the conductors on card 125 may be routed with similar flexibility to any of the output connections of the header assembly. With the sandwich arrangement shown, it becomes a simple matter to route each of the conductors to any desired connection points, using eyelets and wires to adjacent boards to overcome wire-crossing problems. In FIG. 6*b* a bare wire 105 is shown soldered to the outside of card 122, passing through holes in cards 123 and 124 and being soldered to the outside of card 125. To transfer critical circuit lines from one card to another, short lengths of insulated wire, such as 106, may be routed through metal eyelets, such as 107, which are soldered to ground conductor. Particularly sensitive circuits may be provided with extra amounts of shielding to the extent desired, as typified by the wide ground conductor area 142 surrounding conductor 143 on card 126 (FIG. 5). All of the ground conductor area is preferably connected together, and to ground strap 73, which is bolted to the computer signal ground buss 70 as shown in FIG. 3. While both shielded (80) and unshielded wires are shown in FIG. 3 permanently connected to and leading from the headers to remote circuits, it is within the scope of the invention, particularly as respects the unshielded wires 82, to mount further printed circuit connectors (not shown) at the upper edge of the upper headers, and at the lower edges of the lower headers, to allow the wires 82, for example, to be disconnected from the cabling which leads to the remote units.

As thus far described it might appear that many of the signal conductors would be unshielded from each other as soon as they emerged from their respective shield plate cavities to the various cards, and that conductors on one card would necessarily "cross-talk" with those on an adjacent card. To minimize such cross-talk between the conductors, alternate layers of the sandwich assembly include largely ground conductor area, and critical or sensitive circuits are isolated from non-critical circuits. The outside of card 122 carries a number of critical signal conductors, and accordingly, the entire inside surface of card 121 and the entire inner surface of card 122 may carry ground conductor to shield the critical circuits on card 122 on both sides. The outside of card 123, which lies flush against the inside of card 122, is assumed to be blank, and the inside of card 123 is assumed to carry a plurality of non-critical circuit conductors. Card 124, which is blank on both sides, functions as a spacer, a stiffener, and an insulator. Card 125 is assumed to carry further critical circuit conductors on its outside, and hence its inside is completely covered with ground foil. The inside of card 126 carries ground foil on those portions which face critical circuits on card 125, and other portions of the inside of card 125 carry non-critical circuit lines, as does the outside of card 126. Thus the critical circuits on card 122 are shielded by ground foil on cards 121 and 122, the non-critical circuits on card 123 are shielded between ground foil on cards 125 and 126. It may be noted that the foil on the inside of card 121 will also shield the critical circuits on cards 122 from the non-critical circuits of the counterpart card 126 of an adjacent header assembly.

An important feature of the header assemblies of the present invention is that they occupy sufficiently little width to allow them to cover no more than two adjacent columns of patchbay contacts, yet provide ample room for making the many required shielded connections to the patchbay. An actual header assembly of the type illustrated in FIGS. 6*a*–6*c* comprising six cards spaced as shown was only ¾ inch wide, 17 inches high and about 10 inches deep. With patchbay contacts in a given column ⅜ inch apart and the depth of a header about 10 inches, it will be seen that the header depth of the exemplary header is approximately 27 times as great as the patchbay contact separation, which provides ample room for all necessary connections to be made with a header which is not appreciably longer from top to bottom than the column (actually a portion of a full patchbay column) of patchbay contacts, which it engages. Where fewer patchbay contacts in a computer have to connect to as many outgoing terminals, it will be apparent that header depth may be reduced, and where shielding is largely unnecessary, as in headers designed to connect to logic patchbay 14, header depth may be reduced. It is a further feature of the invention that header depth need not be increased in proportion to the maximum number of connections which must be made to a given patchbay contact, as connection of a given patchbay contact to one card of a header immediately provides an enlarged two-dimensional area in which the connectors may be fanned out or spread apart to allow large numbers of connections to be made, and the use of jumpers to other cards of the sandwich then may provide a plurality of two-dimensional areas in which an even greater number of connections may be made. This allows the overall depth of a header to be substantially tailored to the *averaged* number of connections which must be made to the contacts of its respective row of the patchbay.

The header assembly illustrated in FIG. 5 is more complex than what is required for some connections needed in the computer. For example, in installations like that illustrated where a separate patchbay 14 is provided for logic (i.e. Boolean) signals, it is usually deemed unecessary to shield the logic signals from each other, and the header assemblies which plug into logic patchbay 14 may dispense with much of the ground conductor area utilized in the analog header of FIG. 5, and may also omit the ground shield plates 110, 112, 114 at their front edges.

It is important to note that the use of the invention allows the equipment complement in a computer to be altered in the field easily and economically. Any given header may be unplugged from the patchbay and a similar header having different circuitry may be substituted. Then different printed circuit cards may be installed in the component module can which engages the new header. An overlay may be cemented over the corresponding rows of the patchboards used with the computer. Thus drastic revisions may be made in the computer without cutting or re-routing any large number of cables or wires.

FIGS. 8, 8*a* and 8*b* illustrate an alternate form of circuit connection card assembly which performs not only the functions of the headers described above, but also acts as the computer patchbay itself. FIG. 8 illustrates a header assembly 150 which covers entirely from top to bottom, an area between two fixed braces 151, 152 which are mounted to the front of the computer housing (not shown). Top and bottom front edge portions 154, 155 of the header plug into printed circuit ribbon connectors 157, 158, a plurality of connectors 159, 159 are mounted on the rear edge of header assembly 150 to receive rear-mounted printed circuit networks (not shown), and various cables and wires 160, 160 extend from the header to connect to various circuits.

The header assembly 150 is shown in cross-section as including a plurality of shield pieces 162 and 164, both of which may take the form of shield plate 114 of FIG. 5, a plurality of etched circuit boards 166 and 168 generally similar to cards 122 and 125 of FIG. 5, and a further shield plate 170, which is similar to center shield 112 of FIG. 5. Rather than being provided with box contacts along their front edges, cards 166 and 168 are provided with leaf-spring electrical contacts, 174, 174, which are staked on, clenched and soldered on the circuit boards. Printed conductors on the circuit boards connect each leaf-spring contact with an adjacent eyelet 176, and further printed conductors lead rearwardly from the eyelets, being insulated from the rear edge of shields 162 and 164 by thin strips of insulation 178 just as in the header of FIG. 5. Screws such as screw 182 and nuts 184 hold the assembly together, and both screws and nuts are preferably recessed as shown so that both sides of the header assembly are completely flat.

A plurality of such headers may be mounted side by side, with their front faces thereby forming a patchbay. A conventional plug-board may be rested on lower brace 152 and then pushed rearwardly, so that the contacts of cord and plug tips inserted in the plugboard contact respective ones of leaf springs 174, 174, thereby making contacts with the conductors on the header cords. After being pushed forwardly to engage the leaf-spring contacts, the patchboard may be shifted leftwardly in conventional manner, by means of either a motor or a lever (not shown), to increase the contact pressure on all of the patched leaf spring contacts and insure good electrical contact.

While the header of FIG. 5 and that of FIG. 8 are both shown as being two columns wide, and while such a width provides a header of a size and weight which may be easily handled, it should be clearly understood that it is within the scope of the invention to provide similar header assemblies only one column wide or three or more columns wide.

While each of the headers shown has been illustrated as having a plurality of female printed-circuit ribbon connectors fixedly soldered to conductors at a rear edge, it is within the scope of the invention to fixedly attach such connectors instead to the apparatus which is intended to plug connectively to the rear of the headers, and merely to run the etched circuit conductors on the header cards to their rear edges, just as the conductors are shown run to the front edges of various of the header cards to engage the connectors above and below patchbay 12. It will also be apparent that header assemblies may be constructed to run horizontally rather than vertically, so that a given header engages all of or a portion of a *row* of patchbay contacts rather than a *column* of such contacts as shown. Accordingly, the terms "row" and "column" in the claims each are to be interpreted broadly, to include either direction.

In this application the terms "etched circuit" and "printed circuit" are used interchangeably, and it will be apparent that the precise process utilized to place the conductors on the header cards is not critical to the invention.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

The embodiments of the invention in which an exclusive property or privilege is claimed are defined as follows:

1. An electronic apparatus distribution assembly, comprising, in combination: a panel having rows and columns of contacts extending in respective first and second directions, said second direction benig perpendicular to said first direction; a circuit connection assembly comprising a sandwich construction of a plurality of side-by-side etched circuit boards carrying printed conductors and mechanically rigidly attached together, with first connection means rigidly affixed to one or more of said circuit boards at a front edge of said circuit connection assembly and adapted to detachably connect various of said printed conductors to various of said contacts on said panel, with the planes of said circuit boards extending parallel to each other in one of said directions and perpendicularly to said panel; and second connection means for connecting various of said printed conductors at a second edge of said circuit connection assembly to further apparatus.

2. An assembly according to claim 1 in which at least one of said etched circuit boards extends in one of said directions beyond an edge of said panel, in which at least one further connector means is fixedly mounted relative to said panel beyond said edge of said panel in said one of said directions, and in which various of said printed conductors are adapted to mate with said further connector means.

3. An assembly according to claim 1 in which at least one of said etched circuit boards extends back from said panel for a distance at least ten times as great as the separation between adjacent pairs of contacts of a column of said contacts on said panel.

4. An electronic apparatus distribution assembly according to claim 1 in which said panel comprises a patchbay adapted to receive a removable plugboard to establish electrical connections to selected ones of said contacts.

5. An electronic distribution assembly according to claim 1 having a pair of said sandwich-construction circuit connection assemblies mounted upon and electrically contacting groups of contacts of plural adjacent columns of said contacts on said panel; and an electronic component assembly having third and fourth connection means located at a front edge of said component assembly, said third connection means being adapted to engage said second connection means of one circuit connection assembly of said pair, and said fourth connection means being adapted to engage said second connection means of the other circuit connection assembly of said pair.

6. An electronic distribution assembly according to claim 1 having an electronic component assembly rack carrying a plurality of electronic circuits, said component assembly being adapted to mount against said circuit connection assembly at said second edge thereof and said second connection means being adapted to connect said electronic circuits to said various of said printed conductors at said second edge of said circuit connection assembly.

7. An assembly according to claim 1 in which at least one pair of said contacts on said panel are shielded from each other, and in which said circuit connection assembly includes a ground conductor area plated on one of said etched circuit boards and interposed between the conductors within said circuit connection assembly which connect to said pair of contacts.

8. An electronic distribution assembly according to claim 1 having a first plurality of said sandwich-construction circuit connection assemblies mounted against and electrically contacting groups of contacts of plural adjacent columns of said contacts on said panel; first and second rigid electronic component assemblies having respective third connection means at their front edges to engage said second connection means of said circuit connection assemblies and respective fourth connection means at their rear edges; and a further rigid component assembly having fifth connection means at its front edge, said fifth connection means being adapted to engage the fourth connection means of both said first and said second electronic component assemblies.

9. An electronic distribution assembly according to claim 1 in which said plurality of etched circuit boards include first and second boards each having ground conductor areas facing each other, and a third board having a plurality of conductors, said third board being situated between said first and said second boards, whereby said ground conductor areas shield said plurality of conductors.

10. An electronic assembly according to claim 1 having a conductive eyelet extending between at least two adjacent boards of said circuit connection assembly, and an insulated wire passing through said eyelet to interconnect conductive portions of a pair of said boards of said assembly.

11. An electronic distribution assembly according to claim 1 in which said sandwich assembly includes a plurality of double-sided etched circuit boards spaced from each other.

12. An electronic distribution assembly according to claim 1 having a pair of said sandwich-construction circuit connection assemblies mounted upon and electrically contacting groups of contacts in adjacent columns of said contacts of said panel.

13. An electronic distribution assembly according to claim 1 in which said circuit connection assembly extends across an entire column of said contacts on said panel.

14. An electronic distribution assembly according to claim 1 in which various of said etched circuit boards carry plated ground conductor shield means which extend forwardly to portions of said front edge of said assembly to shield signal conductors on said circuit boards.

15. An electronic distribution assembly according to claim 1 in which said circuit connection assembly includes third connector means attached to various of said printed conductors and rigidly affixed to a third edge of said assembly.

16. An electronic distribution assembly according to claim 1 in which a first of said etched circuit boards of said circuit connection assembly includes at least one through hole and in which a conductor extends through said hole to connect a conductor on a second of said circuit boards located on one side of said first circuit board to a further conductor on a third of said circuit boards located on the opposite side of said first circuit board.

17. An assembly according to claim 5 in which said electronic component assembly comprises a rack and a plurality of further etched circuit cards mounted in said rack, with the planes of said further etched circuit cards parallel to the planes of said etched circuit cards of said circuit connection assemblies, and with the front edges of various of said further etched circuit cards engaging said second connection means of said circuit connection assemblies.

18. An electronic computer assembly, comprising, in combination: a plurality of sandwich construction etched circuit board assemblies, each of said assemblies comprising a plurality of etched circuit boards rigidly attached together, and a plurality of spring contacts mounted adjacent a front edge of at least one circuit board of each said assembly, said assemblies being mounted adjacent each other to provide a matrix of rows and columns of said spring contacts, a plurality of etched circuit conductors on said circuit boards extending from said spring contacts to at least one other edge of each of said assemblies; and a removable patchboard having a matrix of holes and adapted to receive the ends of a plurality of patchcords and thereby connect each of the ends of said patchcords to a respective one of said spring contacts.

19. An electronic apparatus distribution assembly, comprising, in combination: a panel having rows and columns of contacts extending in respective first and second directions, said second direction being perpendicular to said first direction, and each of said contacts extending through said panel and rearwardly from said panel; a circuit connection assembly comprising a plurality of etched circuit boards carrying printed conductors and arranged in planes parallel to each other and spaced apart from each other at distances corresponding to the distances between said columns of contacts; first connection means affixed to and situated at a front edge of one or more of said circuit boards of said circuit connection assembly and adapted to detachably connect various of said printed conductors to various of said contacts on said panel, the planes of said circuit boards extending perpendicularly to said panel; and second connection means for detachably connecting various of said printed conductors at a second edge of said circuit connection assembly to further apparatus.

20. A distribution assembly according to claim 19 having a further board extending parallel to said etched circuit boards and mechanically affixed to at least one of said etched circuit boards.

21. An assembly according to claim 20 in which said further board comprises a stiffener board.

22. An assembly according to claim 20 in which said further board acts as shielding means between a pair of said etched circuit boards.

23. An electronic computer assembly, comprising, in combination: a plurality of etched circuit boards carrying printed conductors and arranged in planes parallel to each other; a plurality of spring contacts mounted adjacent a front edge of each of said circuit boards, said circuit boards being spaced from each other to provide a matrix of rows and columns of said spring contacts, a plurality of said etched circuit conductors on said circuit boards each extending from one of said spring contacts to at least one other edge of its associated etched circuit board; and a removable patchboard having a matrix of holes and adapted to receive the ends of a plurality of patchcords and thereby connect each of the ends of said patchcords to a respective one of said spring contacts.

24. An assembly according to claim 23 having a further plurality of plane board means respectively located between adjacent pairs of said etched circuit boards.

25. An assembly according to claim 23 in which each of said board means of said further plurality acts as a mechanical stiffener.

26. An assembly according to claim 23 in which each of said board means of said further plurality functions as shielding means between a pair of said etched circuit boards.

References Cited

UNITED STATES PATENTS

| | | |
|---|---|---|
| 2,958,013 | 10/1960 | Ansley. |
| 3,179,913 | 4/1965 | Mittler et al. |
| 3,311,792 | 3/1967 | Scoville. |
| 3,320,483 | 5/1967 | Pohl. |

LEWIS H. MYERS, *Primary Examiner.*

J. R. SCOTT, *Assistant Examiner.*

U.S. Cl. X.R.

339—18